US010399753B1

(12) United States Patent
Migas et al.

(10) Patent No.: US 10,399,753 B1
(45) Date of Patent: Sep. 3, 2019

(54) CLOSURE WITH 2-STAGE TAG

(71) Applicant: CLOSURE SYSTEMS INTERNATIONAL INC., Lake Forest, IL (US)

(72) Inventors: Jeremiah Migas, Crawfordsville, IN (US); Jeremy Morin, Zionsville, IN (US)

(73) Assignee: Closure Systems International Inc., Memphis, TN (US)

( * ) Notice: Subject to any disclaimer, the term of this patent is extended or adjusted under 35 U.S.C. 154(b) by 0 days.

(21) Appl. No.: 16/057,708

(22) Filed: Aug. 7, 2018

(51) Int. Cl.
| *B65D 51/24* | (2006.01) |
| *B65D 41/34* | (2006.01) |
| *G06K 19/07* | (2006.01) |
| *B65D 41/04* | (2006.01) |
| *B29L 31/56* | (2006.01) |
| *B29C 45/14* | (2006.01) |
| *B29K 23/00* | (2006.01) |

(52) U.S. Cl.
CPC ....... *B65D 51/245* (2013.01); *B65D 41/0421* (2013.01); *B65D 41/3409* (2013.01); *B65D 41/3447* (2013.01); *G06K 19/0723* (2013.01); *B29C 45/14639* (2013.01); *B29K 2023/065* (2013.01); *B29L 2031/565* (2013.01)

(58) Field of Classification Search
CPC .............. B65D 51/245; B65D 41/3447; B65D 41/3409; B65D 41/0421; G06K 19/0723; G06K 19/07749
USPC ...................................................... 340/572.8
See application file for complete search history.

(56) References Cited

U.S. PATENT DOCUMENTS

| 3,472,409 | A | * | 10/1969 | Slack | ..................... | B65D 55/02 |
| | | | | | | 215/221 |
| 5,213,224 | A | * | 5/1993 | Luch | ..................... | B65D 1/023 |
| | | | | | | 215/256 |
| 6,170,683 | B1 | * | 1/2001 | Montgomery | ..... | B65D 41/3442 |
| | | | | | | 215/225 |
| 6,173,853 | B1 | * | 1/2001 | Luch | ..................... | B65D 1/023 |
| | | | | | | 215/256 |
| 6,859,745 | B2 | * | 2/2005 | Carr | ..................... | B65D 51/245 |
| | | | | | | 702/81 |
| 7,098,794 | B2 | | 8/2006 | Lindsay | | |

(Continued)

FOREIGN PATENT DOCUMENTS

| CN | 1172759 A | 11/1998 |
| CN | 102663468 A | 9/2012 |

(Continued)

*Primary Examiner* — John A Tweel, Jr.
(74) *Attorney, Agent, or Firm* — Nixon Peabody LLP

(57) ABSTRACT

A closure includes a top wall portion, an annular skirt portion depending from the top wall portion and a tamper-evident band. The skirt portion includes an internal thread formation. The tamper-evident band depends from and is at least partially detachably connected to the skirt portion by a frangible connection. The closure further includes a 2-stage tag imbedded therein. The 2-stage tag includes an antenna, a switch with a plurality of leads, and a chip or integrated circuit. The current path of the switch is interrupted after the tamper-evident band has been at least partially broken from the skirt portion. The chip stores first and second readable codes that correspond to unopened and opened positions. The frangible connection extends through the 2-stage tag and includes at least two bridges.

20 Claims, 6 Drawing Sheets

(56) References Cited

U.S. PATENT DOCUMENTS

| | | | |
|---|---|---|---|
| 7,479,887 B2* | 1/2009 | Meyer | B65D 41/3423 |
| | | | 340/571 |
| 7,948,381 B2 | 5/2011 | Lindsay | |
| 8,120,484 B2* | 2/2012 | Chisholm | G06K 7/10178 |
| | | | 215/201 |
| 8,169,318 B2* | 5/2012 | Atherton | G06K 19/073 |
| | | | 340/572.1 |
| 8,453,866 B2 | 6/2013 | Kamath | |
| 8,487,769 B2* | 7/2013 | Lindsay | G06K 19/0717 |
| | | | 340/539.11 |
| 8,686,856 B2* | 4/2014 | Stefanelli | G08B 13/1427 |
| | | | 340/572.1 |
| 8,763,830 B2 | 7/2014 | Sadiq | |
| 8,807,360 B2 | 8/2014 | Erspamer | |
| 10,138,037 B2* | 11/2018 | Migas | B65D 51/145 |
| 2007/0152829 A1 | 7/2007 | Lindsay | |
| 2018/0137533 A1 | 5/2018 | Pilarz | |

FOREIGN PATENT DOCUMENTS

| | | |
|---|---|---|
| JP | 2017-190138 A | 10/2017 |
| WO | WO 2017/161410 A1 | 9/2017 |

\* cited by examiner

CLOSURE WITH 2-STAGE TAG

FIELD OF THE INVENTION

The present invention relates generally to a polymeric closure for a package. More specifically, the present invention relates to a polymeric closure with a tamper-evident band and a 2-stage tag.

BACKGROUND OF THE INVENTION

Polymeric closures have been used in many applications over the years in conjunction with containers. One type of polymeric closure that has been used with containers is a tamper-evident polymeric closure. Tamper-evident closures are used to prevent or inhibit tampering by providing a visible indication to a user if the closure has been opened. This visual indication typically divides the closure into two separate components after the tamper-evident feature has been broken. The top portion of the closure is then removed from the container to gain access to the contents of the containers.

It would be desirable to provide a closure that has a tamper-evident feature that has an ability to provide discrete pre- and post-open readings, while still performing all of the desirable properties of a closure.

SUMMARY

According to one embodiment, a closure comprises a first closure portion and a second closure portion. The first closure portion includes a polymeric top wall portion, a polymeric annular skirt portion depending from the polymeric top wall portion. The annular skirt portion includes an internal thread formation for mating engagement with an external thread formation of a container. The second closure portion includes a polymeric tamper-evident band. The tamper-evident band depends from and is at least partially detachably connected to the polymeric annular skirt portion by a frangible connection. The closure has an unopened position and an opened position. The opened position occurs when the tamper-evident band has been at least partially broken from the polymeric annular skirt portion. The closure includes a 2-stage tag imbedded therein. The 2-stage tag includes an antenna, a switch with a plurality of leads, and a chip or integrated circuit. The current path of the switch is interrupted after the tamper-evident band has been at least partially broken from the polymeric annular skirt portion. The chip or integrated circuit stores a first readable code and a second readable code. The first readable code is obtained when the closure is in the unopened position. The second readable code is obtained when the closure is in the opened position. The frangible connection extends through the 2-stage tag and includes at least two bridges.

According to another embodiment, a package is formed. The package comprises a container and a closure. The container has a neck portion defining an opening. The container has an external thread formation on the neck portion. The closure is configured for fitment to the neck portion of the container for closing the opening. The closure includes a first closure portion and a second closure portion. The first closure portion includes a polymeric top wall portion, a polymeric annular skirt portion depending from the polymeric top wall portion. The annular skirt portion includes an internal thread formation for mating engagement with an external thread formation of a container. The second closure portion includes a polymeric tamper-evident band. The tamper-evident band depends from and is at least partially detachably connected to the polymeric annular skirt portion by a frangible connection. The closure has an unopened position and an opened position. The opened position occurs when the tamper-evident band has been at least partially broken from the polymeric annular skirt portion. The closure includes a 2-stage tag imbedded therein. The 2-stage tag includes an antenna, a switch with a plurality of leads, and a chip or integrated circuit. The current path of the switch is interrupted after the tamper-evident band has been at least partially broken from the polymeric annular skirt portion. The chip or integrated circuit stores a first readable code and a second readable code. The first readable code is obtained when the closure is in the unopened position. The second readable code is obtained when the closure is in the opened position. The frangible connection extends through the 2-stage tag and includes at least two bridges.

According to one method, a closure is formed. A 2-stage tag is inserted into a mold. The 2-stage tag includes an antenna, a switch having a plurality of leads, and a chip or integrated circuit. The chip or integrated circuit stores a first readable code and a second readable code. The first readable code is obtained when the closure is in the unopened position. The second readable code is obtained when the closure is in the opened position. The polymeric material is inserted into the mold. The polymeric top wall portion and a polymeric annular skirt portion depending from the polymeric top wall portion are formed. The annular skirt portion includes an internal thread formation for mating engagement with an external thread formation of a container. The product is released from the mold. The 2-stage tag is imbedded within the polymeric material. A lower portion of the product is slit to form a general line forming a frangible connection that partially detachably connects the annular skirt portion and a tamper-evident band. The frangible connection extends through the 2-stage tag and includes at least two bridges. The current path of the switch is interrupted after the tamper-evident band has been at least partially broken from the polymeric annular skirt portion.

The above summary is not intended to represent each embodiment or every aspect of the present invention. Additional features and benefits of the present invention are apparent from the detailed description and figures set forth below.

BRIEF DESCRIPTION OF THE DRAWINGS

Other advantages of the invention will become apparent upon reading the following detailed description and upon reference to the drawings in which.

Figure 1A:
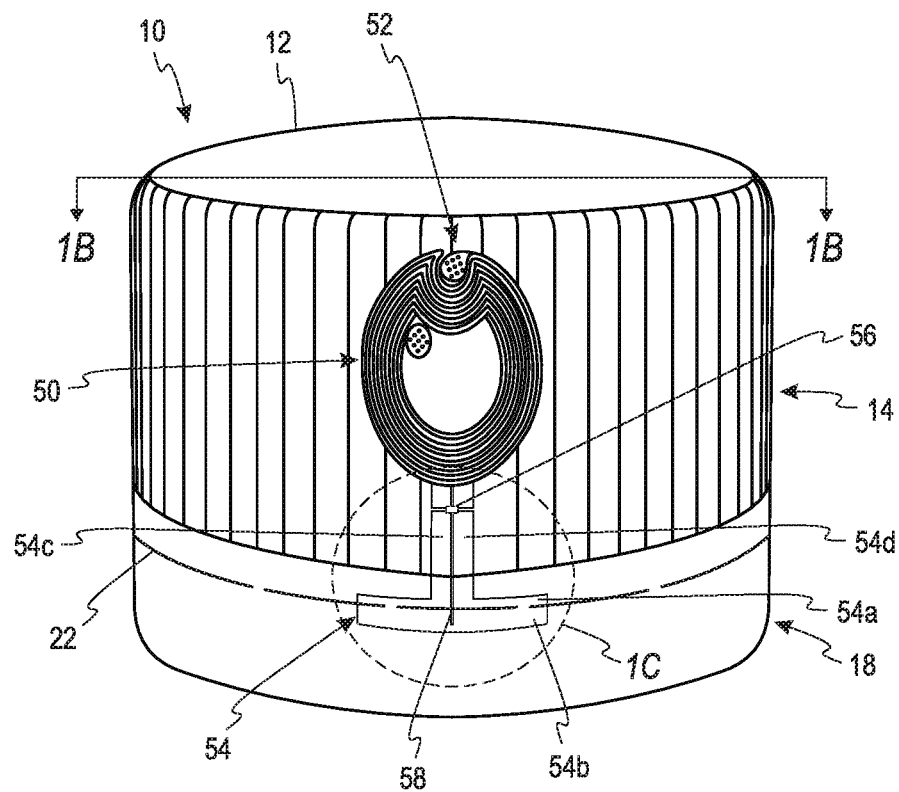
FIG. 1A is a top perspective view of a closure in an unopened position according to one embodiment.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Figure 1B:
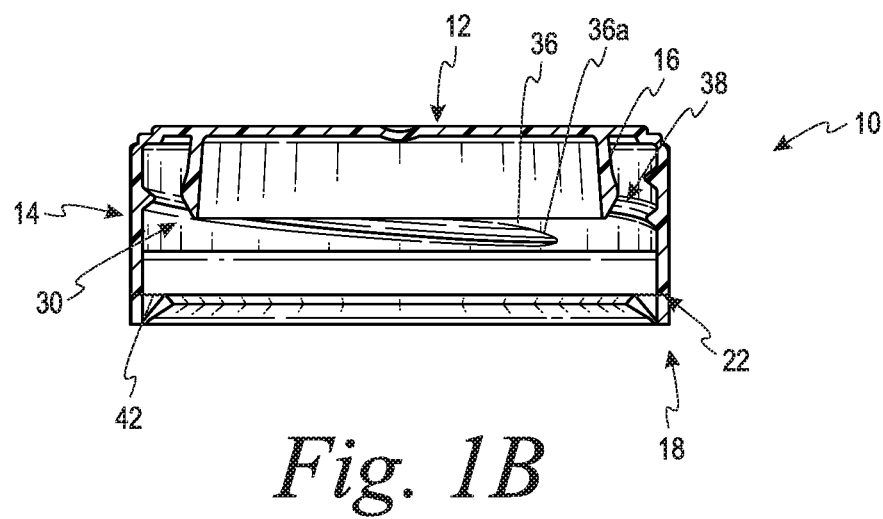
FIG. 1B is a cross-sectional view taken generally along line 1B-1B in FIG. 1A.
Figure 2:
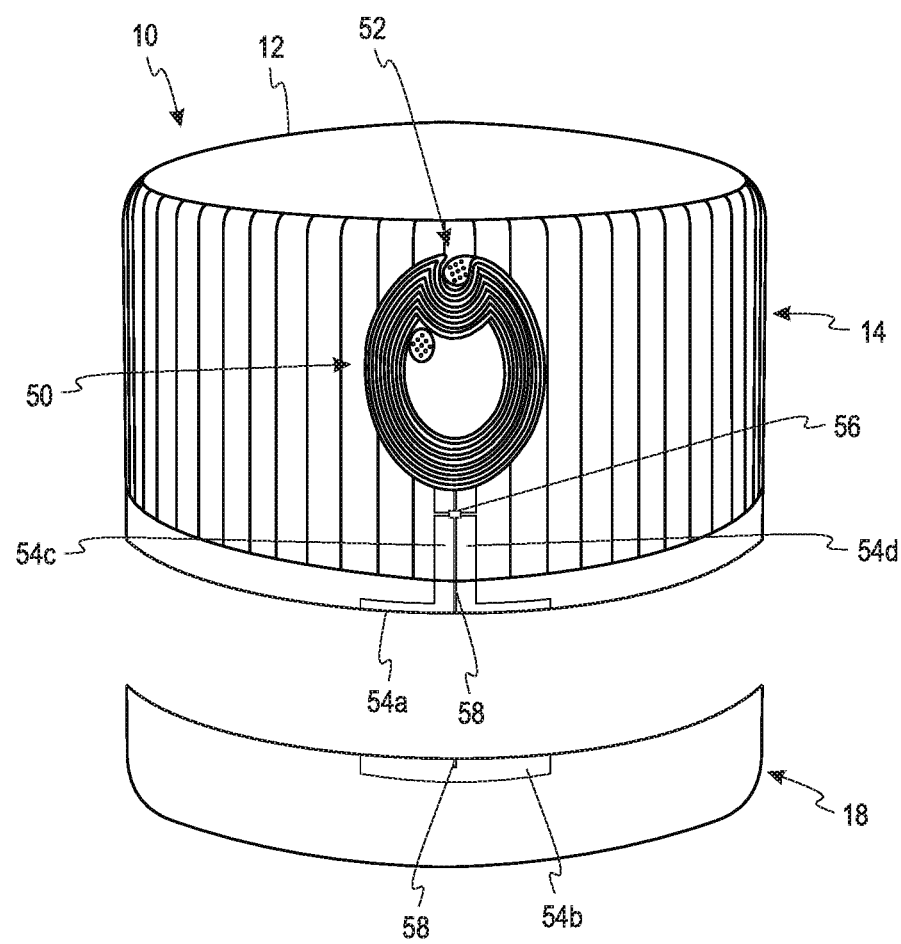
FIG. 2 is a top perspective view of the closure of FIG. 1A in an opened position.

FIGS. 1A-B and 2 illustrate a polymeric closure 10 according to one embodiment of the present invention. The closures are configured to be placed on a container or bottle that contain product. The product is typically a liquid product, but also may be a solid product or a combination of a liquid and solid product. The polymeric closure 10 of FIGS. 1A-B and 2 is a one-piece closure assembly. The polymeric closure 10 is generally cylindrically shaped.

Referring still to FIGS. 1A-B and 2, the polymeric closure 10 includes a polymeric top wall portion 12, a polymeric annular skirt portion 14 that depends from the polymeric top wall portion 12, a polymeric continuous plug seal 16 (FIG. 1B), and a tamper-evident band 18. The top wall portion 12 extends across the entire top of the closure without any openings in this embodiment.

The polymeric annular skirt portion includes an internal thread formation 30 as shown in FIG. 1B. The internal thread formation includes a plurality of leads in one embodiment. The internal thread formation 30 is configured for mating engagement with a corresponding external thread formation of a neck portion of a container. The internal thread formation 30 depicted in FIG. 1B includes a first closure lead 36 and a second closure lead 38. It is contemplated that the internal thread formation may be continuous in another embodiment.

The first closure lead 36 begins near the polymeric top wall portion 12 at a first position (not shown in FIG. 1B) and extends in a helical fashion to a second position 36a closer to the tamper-evident band 18. Similarly, the second closure lead 38 begins near the polymeric top wall portion 12 at a first position (not shown in FIG. 1B) and extends in a helical fashion to a second position (not shown in FIG. 1B) closer to the tamper-evident band 18. The first and second closure leads 36, 38 are referred collectively as a double lead closure thread. Each of the first and second closure leads 36, 38 is continuous. The first positions of the first and second closure leads 36, 38 are located roughly 180 degrees apart from each other and, thus, begin on generally opposing sides of the closure 10.

It is contemplated that the first and second closure leads may be discontinuous. It is also contemplated that the internal thread formation of the closure may differ from a helical thread formation. It is also contemplated that other internal thread formations may be used in the closure.

The polymeric continuous plug seal 16 of FIG. 1B depends from the polymeric top wall portion 12. The continuous plug seal 16 is spaced from an interior surface of the polymeric annular skirt portion 14.

In another embodiment, the closure may be sealed using a polymeric liner and a polymeric disc being located between a top wall portion and the polymeric liner. This is a two-piece closure. Non-limiting examples of a closure including a polymeric liner and a polymeric disc can be found at U.S. Publication No. 2018/0099795, which is incorporated by reference herein. It is contemplated that other sealing methods may be used in sealing the closure.

Referring specifically to FIG. 1B, the polymeric tamper-evident band 18 of the closure 10 is located at the bottom thereof (i.e., an end opposite of the polymeric top wall portion 12). The tamper-evident band 18 depends from and is partially detachably connected to the annular skirt portion 14 by a frangible connection 22. The tamper-evident band 18 works in conjunction with the container to indicate to a user that the contents of the container may have been accessed. More specifically, the tamper-evident band 18 is designed to partially separate from the annular skirt portion 14 if a user opens the package and gains access to the container as shown, for example, in FIG. 2. In one embodiment, the frangible connection may be formed using scoring or scored lines, notches, leaders, nicks or other lines of weaknesses.

The closure 10 includes a 2-stage tag 50. The 2-stage tag in one embodiment is a 2-stage NFC (near field communication) tag. In another embodiment, the 2-stage tag is an RFID (radio frequency identification) tag. It is contemplated that other wireless radio communications tags may be used.

Figure 1C:
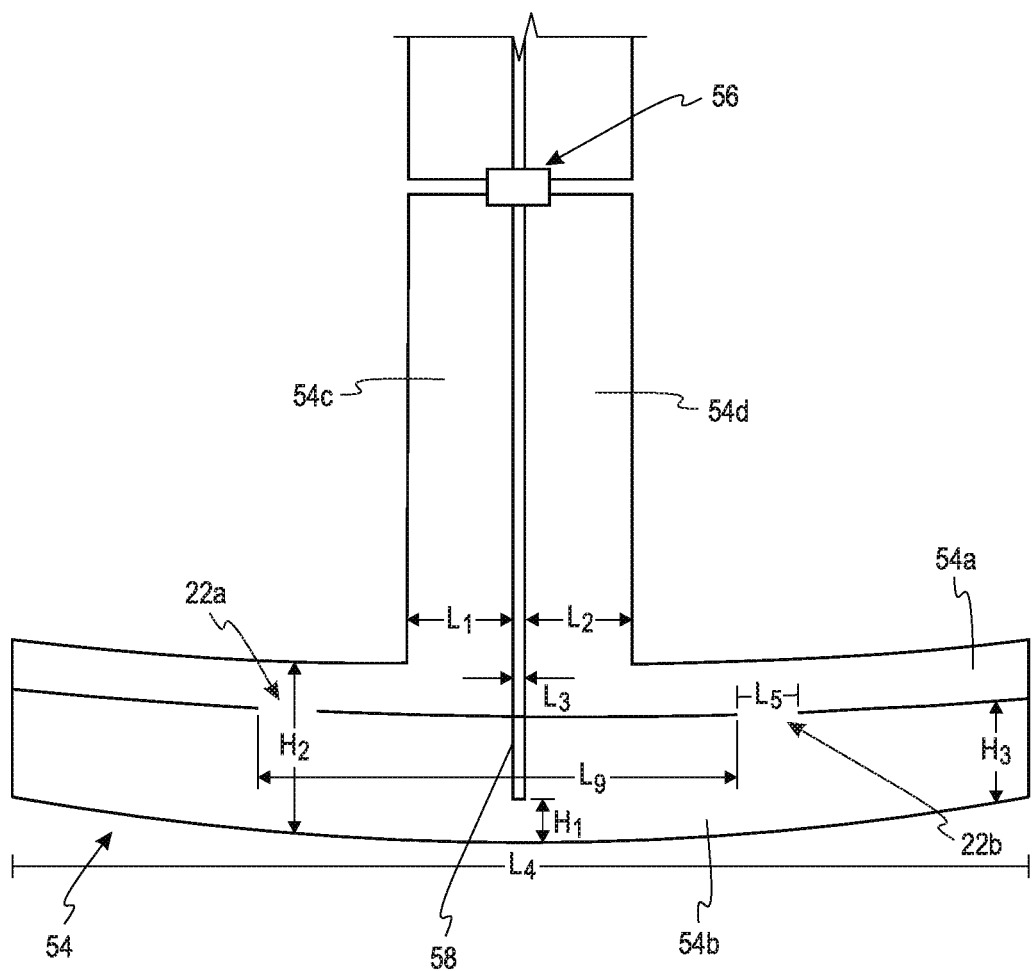
FIG. 1C is an enlarged view of generally circular area FIG. 1C in FIG. 1A.

The 2-stage tag 50 shown in FIGS. 1A and 2 includes an antenna 52, a switch 54 and a chip or integrated circuit 56. FIG. 1C includes the switch 54 and the chip or integrated circuit 56. The chip or integrated circuit 56 is operatively connected with the antenna 52 and the switch 54. The chip or integrated circuit 56 stores first and second readable codes. The first and second readable codes are pre- and post-open codes. As will be discussed below, the 2-stage tag 50 is desirably located flush on an exterior surface of the closure.

The 2-stage tag 50 may include an inlay as will be discussed below with respect to FIG. 4. The inlay 160 assists in keeping the remaining portions of the 2-stage tag 150 together.

Referring back to FIGS. 1A and 2, the antenna 52 is an antenna that assists in communicating and interfacing with equipment regarding information. This information includes, but is not limited to, the first and second readable codes. The antenna 52 provides the desired interface with the equipment such that the equipment can retrieve the electronic information (e.g., the first and second readable codes) carried by the chip or integrated circuit 56. The antenna may in some embodiments be configured to receive remote input from the equipment, which is forwarded to the chip or integrated circuit. The equipment may be a suitable reading device or scanner.

The antenna 52 is located on the annular skirt portion 14 as shown in FIG. 1A. It is contemplated that the antenna may be located on a top wall portion of the closure.

In some embodiments, the antenna 52 cooperates with the chip or integrated circuit to be externally powered without physical connection to a power supply. In this embodiment, the chip or integrated circuit is passive.

The antenna 52 typically comprises at least one metal. Non-limiting examples of metals that may be used in forming the antenna are aluminum and copper. It is contemplated that at least other metals or conductive material may be used in forming the antenna.

The current path of the switch 54 is interrupted after the tamper-evident band 18 has been at least partially broken from the polymeric annular skirt portion 14. This is specifically shown when comparing FIGS. 1A, 1C and 2. The switch 54 includes a first portion 54a and a second portion 54b and is in a closed loop in FIGS. 1A, 1C. The switch 54 includes a first lead 54c and a second lead 54d. The first portion 54a is located on the polymeric annular skirt portion 14, while the second portion 54b is located on the tamper-evident band 18.

The switch 54 typically comprises at least one metal. Non-limiting examples of metals that may be used in forming the switch are aluminum and copper. It is contemplated that at least other metals or conductive material may be used in forming the switch.

When the closure is in an unopened position, the first portion 54a and second portion 54b of the switch 54 are formed in one continuous piece such that the first lead 54c and the second lead 54d are operatively connected. This is shown, for example, in FIGS. 1A, 1C. As shown in FIGS. 1A, 1C, the current path of the switch 54 is operatively connected with the chip or integrated circuit 56 and is in a closed loop circuit. This closed loop circuit remains as a closed loop circuit regardless of the frangible connection orientation. When the tamper-evident band 18 has been broken from the polymeric annular skirt portion 14 via the frangible connection 22, the first portion 54a and the second portion 54b of the switch 54 become separate and distinct portions and the first and second leads 54c, 54d are not operatively connected. This is shown, for example, in FIG. 2. As shown in FIG. 2, the current path of the switch 54 is interrupted and forms an open loop circuit with the chip or integrated circuit 56.

The switch 54 is constructed such that a space 58 is formed. The space 58 is formed without any metal or other conductive material therein. The space 58 is located on both the polymeric annular skirt portion 14 and the tamper-evident band 18. The space 58 assists in providing an open loop after the tamper-evident band 18 has been broken from the polymeric annular skirt portion 14 via the frangible connection 22.

As shown in FIGS. 1A, 1C the switch 54 is shaped in a generally rectangular shape. It is contemplated that the switch may be differently shaped and/or sized than that depicted in FIG. 1A.

The chip or integrated circuit 56 reads the current path of the switch 54 and determines whether the loop is a closed loop or an open loop. If the loop is closed, a first readable code is obtained. If the loop is open, a second readable code is obtained. The 2-stage tag 50 includes a first readable code and a second readable code. The second readable code is read when an interruption of the circuity takes place. This occurs when the first portion 54a and the second portion 54b become separate and distinct portions after the tamper-evident band 18 has been broken from the polymeric annular skirt portion 14 via the frangible connection 22.

The first and second readable codes may assist in anti-counterfeiting, marketing promotions and data management. The anti-counterfeiting may include, but is not limited to, brand protection, trace and track, and anti-theft. The product promotions may include, but are not limited to, coupons, sweepstakes, loyalty programs or reordering opportunities. Data management may include, but is not limited to, scans/sales statistics, track and trace monitoring, scan location, demographic data, loyalty program and out-of-stock monitoring.

The first and second readable codes are configured to interface with associated equipment. For example, the first readable code may be scanned at purchase and later scanned after opening the product. In one embodiment, the first readable code may read "unopened package" and the second readable code may read "opened package". The first and second readable codes may have brand information. The first and second readable codes may have promotional instructions such that the second readable code states that a prize has been won. It is contemplated that other instructions may be provided on product promotions. The first and second readable codes may be directed to data monitoring aspects in another embodiment.

The chip or integrated circuit in one embodiment is passive. In this embodiment, since the chip or integrated circuit is externally powered, this precludes the need for an internal power supply operatively connected to the chip or integrated circuit for providing electrical power thereto.

It is contemplated that the chip or integrated circuit may be active in another embodiment. In this embodiment, a compact power supply is operatively connected to the chip or integrated circuit.

It is contemplated that different chips or integrated circuit may be used including a 4-lead chip. In this embodiment, two of the leads are connected to the antenna and two of the leads are connected to the switch. This is depicted in, for example FIGS. 1A, 1C. It is contemplated that other chips or integrated circuits may be used in the present invention.

The 2-stage tag 50 is shown as being located on the annular skirt portion 14 and the tamper-evident band 18. It is contemplated that the 2-stage tag may be located on the top wall portion, the annular skirt portion and the tamper-evident band.

FIG. 1C depicts lengths of several features. Lengths L1 and L2 are generally from about 2 to about 4 mm, and more typically from about 2.5 to about 3.5 mm. Length L3 is generally from about 0.1 to about 0.3 mm, and more typically from about 0.15 to about 0.25 mm. Length L4 is generally from about 20 to about 40 mm, and more typically from about 25 to about 35 mm. Length L4 is the length of the horizontal portion of the 2-stage tag 50. Length L5 is generally from about 0.5 to about 1.5 mm, and more typically from about 0.75 to about 1.25 mm. Length L5 is the length of the bridge. Length L9 is generally from about 8 to about 18 mm, and more typically from about 10 to about 16 mm. L9 is the length of the scored line, notch or slit plus the length of the bridge 22a, 22b adjacent thereto. The ratio of length L4 divided by 2 to length L9 (L4/2:L9) is greater than 1.1 and more typically greater than 1.2 or 1.4. This assists in making a 2-stage tag that remains in an open loop and includes a bridge on each half of the 2-stage tag.

FIG. 1C also depicts heights of several features. Height H1 is generally from about 0.1 to about 1 mm, and more typically from about 0.2 to about 0.8 mm, and even more typically from about 0.4 to about 0.6 mm. Height H2 is generally from about 4 to about 8 mm, and more typically from about 5 to about 8 mm. Height H3 is generally from about 2 to about 4 mm, and more typically from about 2.5 to about 3.5 mm. The ratio of height H1 to H3 defines the slitting robustness with the lower numbers being more robust to tag and for score height variability.

Figure 4:
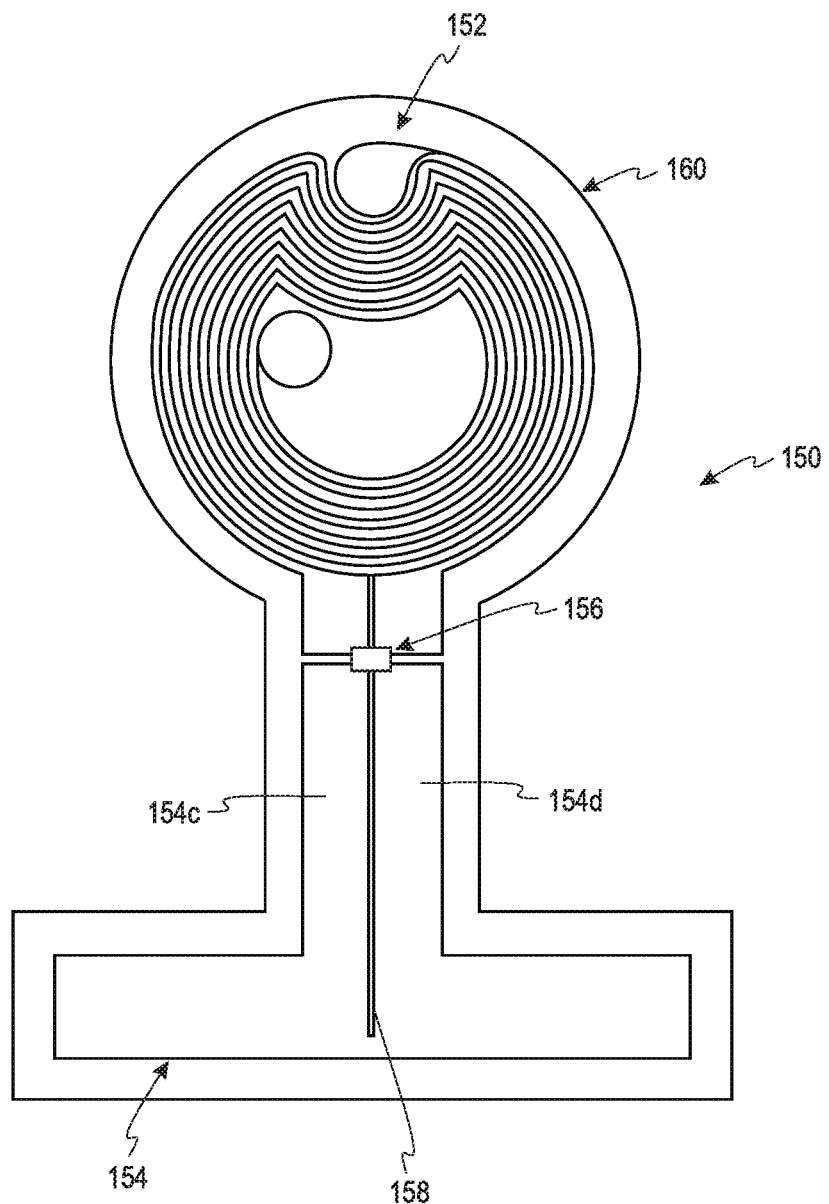
FIG. 4 is a chip or integrated circuit according to another embodiment.

Referring to FIG. 4, a 2-stage tag 150 is shown according to another embodiment. The 2-stage tag 150 includes an antenna 152, a switch 154 and a chip or integrated circuit 156. The chip or integrated circuit 156 stores first and second readable codes and functions similarly to the 2-stage tag 50 described above. The 2-stage tag 150 is shown in the unopened state (a closed loop), which is before the tamper-evident band has been broken from the polymeric annular skirt portion via the frangible connection. The switch 154 of FIG. 4 is in a generally inverted T-shape. The switch includes a first lead 154c and a second lead 154d. It is contemplated that the switch may be of different shapes and/or sizes than that shown in FIG. 4. The 2-stage 150 includes a space 158 formed in the switch 154. The 2-stage tag 150 also further includes an inlay 160. The inlay 160 assists in keeping the remaining portions of the 2-stage tag 150 together. The inlay is desirably comprised of a material that readily bonds with the remainder of the closure. The inlay is typically a polymeric material and is often formed of the same material as the closure.

Figure 5:
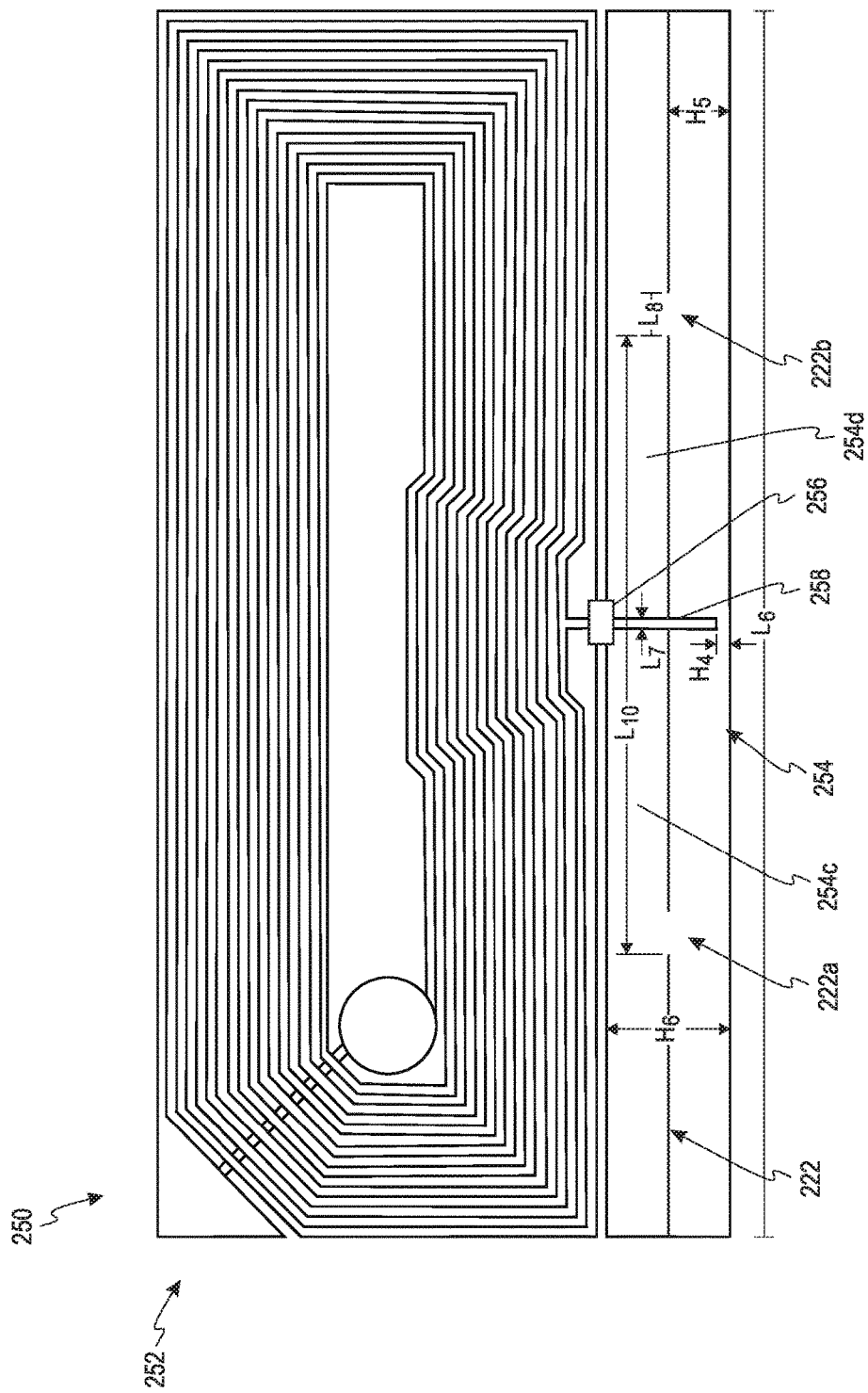
FIG. 5 is a chip or integrated circuit according to a further embodiment.

Referring to FIG. 5, a 2-stage tag 250 is shown according to a further embodiment. The 2-stage tag 250 includes an antenna 252, a switch 254 and a chip or integrated circuit 256. The chip or integrated circuit 256 stores first and second readable codes and functions similarly to the 2-stage tag 50 described above. The 2-stage tag 250 is shown in the unopened state (a closed loop), which is before the tamper-evident band has been broken from the polymeric annular skirt portion via the frangible connection. The 2-stage 250 includes a space 258 formed in the switch 254. The switch 254 shows a plurality of leads 254*c*, 254*d* formed therein. The 2-stage tag 250 is rectangularly shaped. It is contemplated that the 2-stage tag may be of different shapes and/or sizes than that shown in FIG. 5. FIG. 5 also includes a frangible connection 222 with a plurality of bridges 222*a*, 222*b* formed therein.

FIG. 5 depicts lengths of several features. Length L6 is generally from about 10 to about 40 mm, typically from about 15 to about 30 mm and more typically from about 20 to about 30 mm. Length L6 is the length of the 2-stage tag 50. Length L7 is generally from about 0.1 to about 0.3 mm, and more typically from about 0.15 to about 0.25 mm. Length L8 is generally from about 0.5 to about 1.5 mm, and more typically from about 0.75 to about 1.25 mm. Length L8 is the length of the bridge. Length L10 is generally from about 5 to about 18 mm, and more typically from about 7 to about 14 mm. L10 is the length of the scored line, notch or slit plus the length of the bridge 222*b* adjacent thereto. The ratio of length L6 divided by 2 to length L10 (L6/2:L10) is greater than 1.1 and more typically greater than 1.2 or 1.4. This assists in making a 2-stage tag that remains in an open loop and includes a bridge on each half of the 2-stage tag.

FIG. 5 also depicts heights of several features. Height H4 is generally from about 0.1 to about 1 mm, and more typically from about 0.2 to about 0.8 mm, and even more typically from about 0.4 to about 0.6 mm. Height H5 is generally from about 2 to about 4 mm, and more typically from about 2.5 to about 3.5 mm. Height H6 is generally from about 4 to about 8 mm, and more typically from about 5 to about 8 mm. The ratio of height H4 to H5 defines the slitting robustness with the lower numbers being more robust to tag and for score height variability.

Figure 3A:
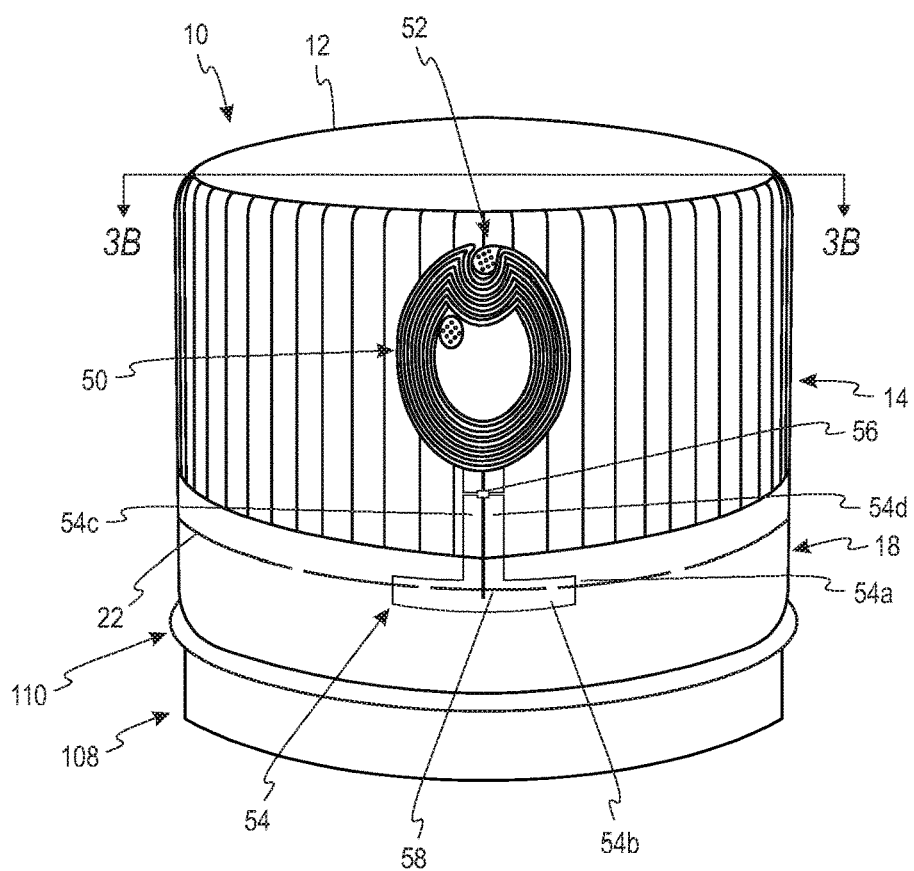
FIG. 3A is a top perspective view of a package including the closure of FIG. 1A and a container in a closed position according to one embodiment.
Figure 3B:
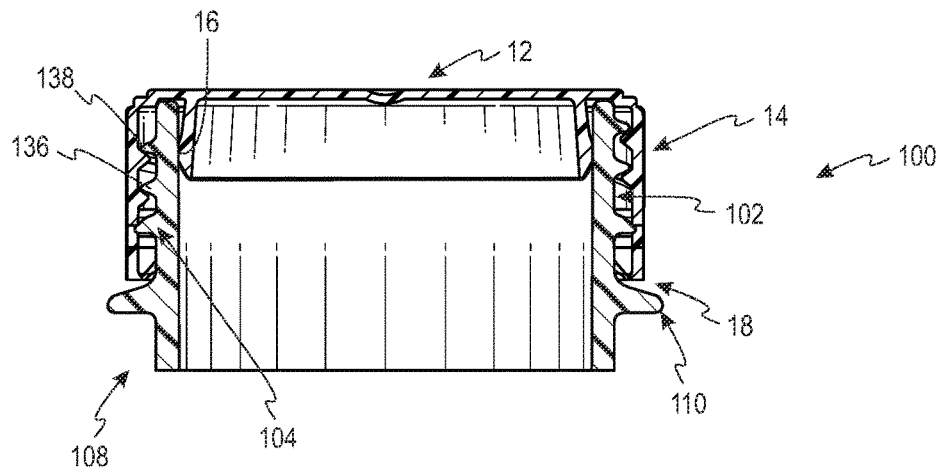
FIG. 3B is a cross-sectional view taken generally along line 3B-3B in FIG. 3A.

One non-limiting example of a closure and a container forming a package is shown and discussed in conjunction with FIGS. 3A-3B.

The closures of the present invention may be used with a container 108 used to form a package 100 of FIGS. 3A-3B. A portion of the container 108 is shown in FIGS. 3A-3B and includes a neck portion 102 that defines an opening. The neck portion 102 of the container 108 includes an external thread formation 104 and a continuous outer ring 110. The external thread formation 104 includes a first finish lead 136 and a second finish lead 138 (FIG. 3B). The external thread formation 104 (finish leads 136, 138) engages with the corresponding internal thread formation 30 (closure leads 36, 38) to seal the package 100.

The first finish lead 136 begins near the open end of the container 108 and extends in a helical fashion to a second position that is closer to the closed end of the container. Similarly, the second finish lead 138 starts closer to the open end of the container 108 and extends in a helical fashion to a second position that is closer to the closed end of the container. Each of the first and second finish leads 136, 138 is continuous. The first positions of the first and second finish leads 136, 138 are located roughly 180 degrees apart from each other and, thus, begin on opposing sides of the neck 102 of the container 108. When opening the container 108, the first closure lead 36 is desirably in contact with the first finish lead 136 and the second closure lead 38 is desirably in contact with the second finish lead 138. It is contemplated that the external thread formation of the container may have discontinuous leads.

It is contemplated that the external thread formation of the container may be different than that disclosed with respect to container 108.

The continuous outer ring 110 assists in positioning the tamper-evident band 18 when the first closure portion 10*a* is unthreaded from the neck 102 of the container 108 by the breaking of the frangible connection 22.

The closures of the present invention may include an oxygen-scavenger material. This oxygen-scavenger material may be distributed within the closure or may be a separate layer. The oxygen-scavenger material may be any material that assists in removing oxygen within the container, while having little or no effect on the contents within the container.

Alternatively, or in addition to, the closures may include an oxygen-barrier material. The oxygen-barrier material may be added as a separate layer or may be integrated within the closure itself. The oxygen-barrier materials assist in preventing or inhibiting oxygen from entering the container through the closure. These materials may include, but are not limited to, ethylene vinyl alcohol (EVOH). It is contemplated that other oxygen-barrier materials may be used in the closure.

The top wall portion 12 and the annular skirt portion 14 are made of polymeric material. The top wall portion 12, the annular skirt portion 14 and the continuous plug seal 16 are typically made of an olefin (e.g., polyethylene (PE), polypropylene (PP)), PET or blends thereof. One example of a polyethylene that may be used is high density polyethylene (HDPE). It is contemplated that the top wall portion, the annular skirt portion and the continuous plug seal may be made of other polymeric materials. The tamper-evident band 18 is typically made of the same materials as the top wall portion 12, the annular skirt portion 14 and the continuous plug seal 16.

The closures are typically formed by processes such as injection or compression molding, extrusion or the combination thereof.

In one method, the 2-stage tag is insert molded with the polymeric material that will form the first and second closure portions. Specifically, the 2-stage tag is placed in the mold and polymeric material is then added to the mold. The polymeric material along with the 2-stage tag is released from the mold. The 2-stage tag in this method is flush with an exterior surface of the closure and is imbedded within the polymeric material.

After being released from the mold, further processing is performed on the product from the mold. Specifically, the frangible connection is then formed. The frangible connection that forms the tamper-evident band occurs using a blade in one method. The frangible connection is formed in one process along general line 42 of FIG. 1B and uses scoring or scored lines, notches, leaders, nicks or line of weaknesses to provide separation of the connection along both general line 42 via the frangible connection 22. This frangible connection also extends through a portion of the 2-stage tag 50 as shown in FIG. 1A. The frangible connection typically extends around the circumference of the closure 10. It is contemplated that the general line may be different than depicted in FIG. 1B.

The 2-stage tag as discussed above is positioned and secured with respect to the eventually formed tamper-evident band 18 so that the first portion 54a and second portion 54b of the switch 54 can be separated into distinct portions after the tamper-evident band 18 is broken from the polymeric annular skirt portion 14.

This method is advantageous for several reasons. The imbedded 2-stage tag is positioned securely within the polymeric material, which makes it very difficult to remove from the rest of the closure. This assists in preventing or inhibiting tampering with the 2-stage tag on the closure. By being flush with the exterior surface of the closure, problems are reduced or eliminated when the user opens the closure via the frangible connection and separates the 2-stage tag into distinct portions. The method also provides a better balance with the strength of the bridges formed by the frangible connection by not being too weak or too strong. The 2-stage tag in this process also has improved aesthetic appeal to a user.

The container 108 is typically made of polymeric material. One non-limiting example of a material to be used in forming a polymeric container is polyethylene terephthalate (PET), polypropylene (PP) or blends using the same. It is contemplated that the container may be formed of other polymeric or copolymer materials. It is also contemplated that the container may be formed of glass. The container 108 typically has an encapsulated oxygen-barrier layer or oxygen barrier material incorporated therein.

To open the container 108 and gain access to the product therein, the closure 10 is unthreaded by turning the closure 10 with respect to the container 108. After the closure has been unthreaded, the closure 10 is spaced apart.

The polymeric closures are desirable in both low-temperature and high-temperature applications. The polymeric closures may be used in low-temperature applications such as an ambient or a cold fill. These applications include water, sports drinks, aseptic applications such as dairy products, and pressurized products such as carbonated soft drinks. It is contemplated that other low-temperature applications may be used with the polymeric closures of the present invention.

The polymeric closures may be exposed to high-temperature applications such as hot-fill, pasteurization, and retort applications. A hot fill application is generally performed at temperatures around 185° F., while a hot-fill with pasteurization is generally performed at temperatures around 205° F. Retort applications are typically done at temperatures greater than 250° F. It is contemplated that the polymeric closures of the present invention can be used in other high-temperature applications.

What is claimed is:

1. A closure comprising:
   a first closure portion including:
      a polymeric top wall portion;
      a polymeric annular skirt portion depending from the polymeric top wall portion, the annular skirt portion including an internal thread formation for mating engagement with an external thread formation of a container; and
   a second closure portion including:
      a polymeric tamper-evident band, the tamper-evident band depending from and being at least partially detachably connected to the polymeric annular skirt portion by a frangible connection,
   wherein the closure has an unopened position and an opened position, the opened position occurring when the tamper-evident band has been at least partially broken from the polymeric annular skirt portion,
   wherein the closure includes a 2-stage tag imbedded therein, the 2-stage tag including an antenna, a switch with a plurality of leads, and a chip or integrated circuit, the current path of the switch being interrupted after the tamper-evident band has been at least partially broken from the polymeric annular skirt portion, the chip or integrated circuit stores a first readable code and a second readable code, the first readable code being obtained when the closure is in the unopened position, the second readable code being obtained when the closure is in the opened position,
   wherein the frangible connection extends through the 2-stage tag and includes at least two bridges.

2. The closure of claim 1, wherein the 2-stage tag is a 2-stage NFC tag.

3. The closure of claim 2, wherein the 2-stage NFC tag is passive.

4. The closure of claim 2, wherein the 2-stage NFC tag is active.

5. The closure of claim 1, wherein the 2-stage tag is a 2-stage RFID tag.

6. The closure of claim 5, wherein the 2-stage RFID tag is passive.

7. The closure of claim 5, wherein the 2-stage RFID tag is active.

8. The closure of claim 1, wherein the closure is a one-piece closure.

9. The closure of claim 1, wherein the closure comprises polyolefins.

10. The closure of claim 1, wherein the first closure portion further includes a polymeric continuous plug seal depending from the polymeric top wall portion, the continuous plug seal being spaced from an interior surface of the polymeric annular skirt portion.

11. The closure of claim 1, wherein the 2-stage tag is flush with an exterior surface of the closure.

12. A package comprising:
   a container having a neck portion defining an opening, the container having an external thread formation on the neck portion; and
   a closure being configured for fitment to the neck portion of the container for closing the opening, the closure including a first closure portion and a second closure portion, the first closure portion including a polymeric top wall portion, a polymeric annular skirt portion depending from the polymeric top wall portion, the annular skirt portion including an internal thread formation for mating engagement with an external thread formation of a container, the second closure portion including a polymeric tamper-evident band, the tamper-evident band depending from and being at least partially detachably connected to the polymeric annular skirt portion by a frangible connection,
   wherein the closure has an unopened position and an opened position, the opened position occurring when the tamper-evident band has been at least partially broken from the polymeric annular skirt portion,
   wherein the closure includes a 2-stage tag imbedded therein, the 2-stage tag including an antenna, a switch with a plurality of leads, and a chip or integrated circuit, the current path of the switch being interrupted after the tamper-evident band has been at least partially broken from the polymeric annular skirt portion, the chip or integrated circuit stores a first readable code and a second readable code, the first readable code being obtained when the closure is in the unopened position, the second readable code being obtained when the closure is in the opened position, wherein the frangible connection extends through the 2-stage tag and includes at least two bridges.

13. The package of claim 12, wherein the 2-stage tag is a 2-stage NFC tag.

14. The package of claim 12, wherein the 2-stage tag is a 2-stage RFID tag.

15. The package of claim 12, wherein the closure comprises polyolefins.

16. The package of claim 12, wherein the 2-stage tag is flush with an exterior surface of the closure.

17. A method of forming a closure, the method comprising:

inserting a 2-stage tag into a mold, the 2-stage tag including an antenna, a switch having a plurality of leads, and a chip or integrated circuit, the chip or integrated circuit stores a first readable code and a second readable code, the first readable code being obtained when the closure is in the unopened position, the second readable code being obtained when the closure is in the opened position;

inserting polymeric material into the mold;

forming the polymeric top wall portion and a polymeric annular skirt portion depending from the polymeric top wall portion, the annular skirt portion including an internal thread formation for mating engagement with an external thread formation of a container;

releasing the product from the mold, the 2-stage tag being imbedded within the polymeric material; and slitting a lower portion of the product to form a general line forming a frangible connection that partially detachably connects the annular skirt portion and a tamper-evident band, the frangible connection extending through the 2-stage tag and includes at least two bridges, wherein the current path of the switch is interrupted after the tamper-evident band has been at least partially broken from the polymeric annular skirt portion.

18. The method of claim 17, wherein the 2-stage tag is located flush with an exterior surface of the closure.

19. The method of claim 17, wherein the 2-stage tag is a 2-stage NFC tag.

20. The method of claim 17, wherein the 2-stage tag is a 2-stage RFID tag.

* * * * *